Figure 1:
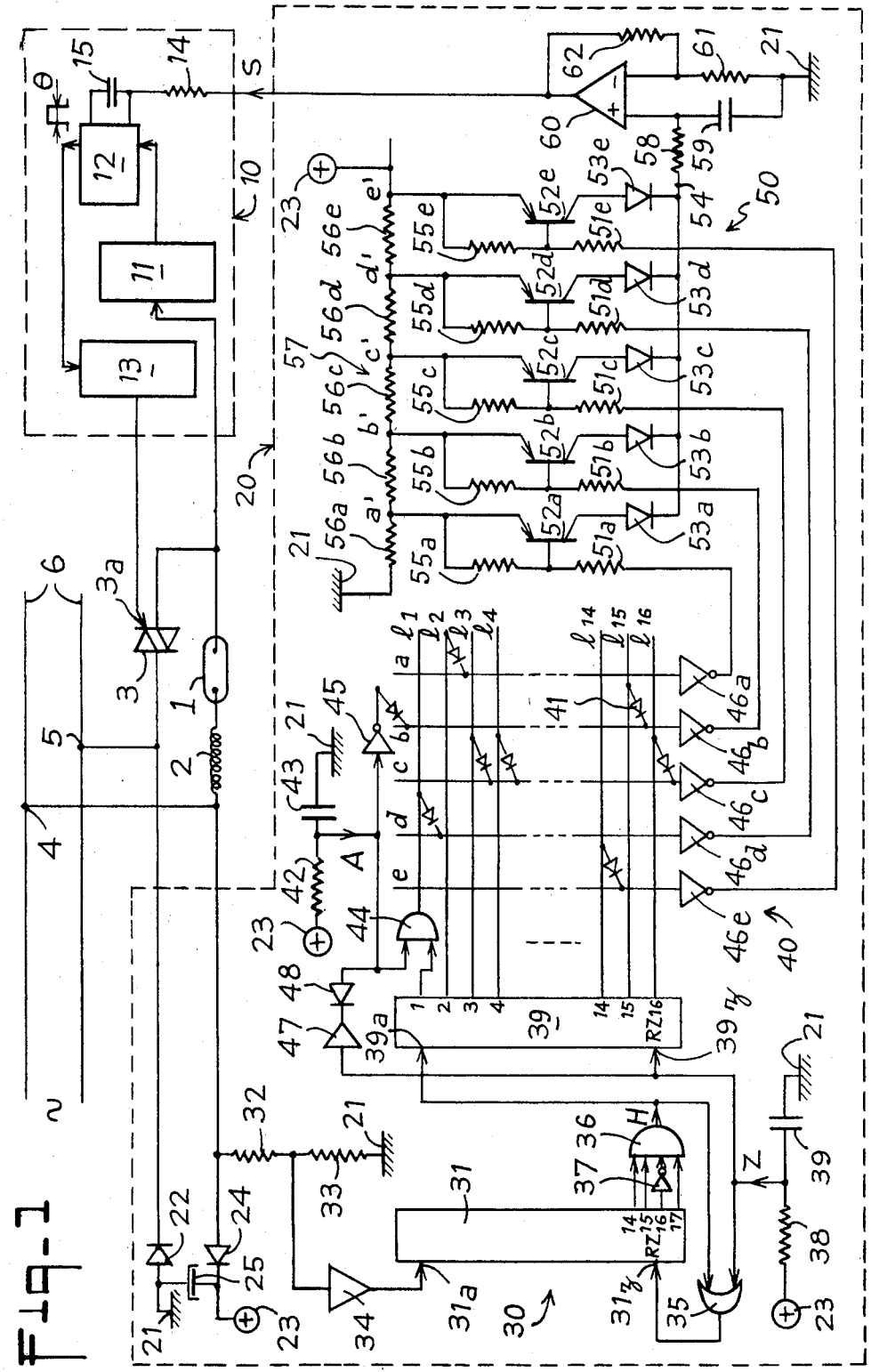

United States Patent [19]

Tarroux et al.

[11] 4,398,131

[45] Aug. 9, 1983

[54] DEVICE FOR CONTROLLING THE VARIATIONS IN TIME OF THE POWER OF A LIGHTING INSTALLATION IN RELATION TO A PRESET PROGRAMME

[75] Inventors: Pierre Tarroux, Paris; Jacques Le Pochard, Belleville sur Saone, both of France

[73] Assignee: Elam Limited, Dublin, Ireland

[21] Appl. No.: 245,253

[22] Filed: Mar. 19, 1981

[30] Foreign Application Priority Data

Mar. 28, 1980 [FR] France .................................. 80 07087

[51] Int. Cl.³ ..................... H05B 37/02; H05B 39/04; H05B 41/18

[52] U.S. Cl. .................................. 315/294; 315/297; 315/307; 315/292; 315/DIG. 4; 315/315; 315/316; 323/322; 323/323

[58] Field of Search ............... 315/291, 294, 297, 293, 315/307, 292, 315, 316, DIG. 4, DIG. 7, 194, 198, 199; 323/322, 323, 326

[56] References Cited

U.S. PATENT DOCUMENTS

| | | | |
|---|---|---|---|
| 4,037,135 | 7/1977 | Novey ................................ | 315/194 |
| 4,147,961 | 4/1979 | Elms .................................... | 315/291 |
| 4,177,407 | 12/1979 | Goldstein et al. ................... | 315/312 |

*Primary Examiner*—Eugene La Roche
*Assistant Examiner*—Vincent DeLuca
*Attorney, Agent, or Firm*—James E. Nilles

[57] ABSTRACT

In a lighting installation comprising light sources each connected to an A.C. supply system, a control device including: power variation circuits connected to the different sources and each comprising means for varying the electrical power supplied to the respective source, in response to magnitude variations of an electrical quantity, and control circuits associated to the different sources and each comprising a clock circuit, an illuminating programme circuit in which is recorded a programme representing desired timed variations of the illuminating power for a given period, a selection circuit receiving clock pulses from the clock circuit and connected to the programme circuit for selecting an illuminating power dependent on the elapsed time from the beginning of said period, and an output circuit for converting said selected power to a particular magnitude of said electrical quantity.

8 Claims, 3 Drawing Figures

DEVICE FOR CONTROLLING THE VARIATIONS IN TIME OF THE POWER OF A LIGHTING INSTALLATION IN RELATION TO A PRESET PROGRAMME

The present invention relates to a device for controlling the variations in time of the power of a lighting installation comprising light sources, each one being connected to an A.C. power supply system, said control device including: power variation circuits connected respectively to the different sources and each one comprising means for varying the electrical power supplied to the source in response to the magnitude variations of an electrical quantity; and control circuits associated respectively to the different sources for controlling the magnitude variations of the said electrical quantity in relation to time so as to vary in a predetermined manner the illuminating power of said sources during a working period of said installation.

A special field of application of the invention is that of the control in time of the lighting level of a public lighting installation.

The concern being to save energy, devices have already been proposed which permit to alter the degree of illumination of light sources in a lighting installation at certain times of the day.

In the case of discharge lamps, a known device consists in controlling the switching on of an extra induction coil in series with that normally provided to limit the discharge current into the lamp. The switching on is done by means of a switch, such as for example, a mechanical relay or a semi-conductor circuit, whose state is controlled by a signal transmitted by a control wire shared with the lighting installation.

It is not possible with such a device to select any other modes of operation but normal power and reduced power, and moreover a control wiring is required in parallel with the mains supply system.

Another known technique consists in varying the voltage of the supply system at the mains terminal on which all the different sources of light are connected. Several levels of power can then be selected. But, in this case, all the light sources are controlled in identical manner, and it may be important sometimes to have different powers of illumination in different areas of a sector covered by a public lighting installation.

It is the object of the present invention to propose a control device re-grouping for example the following properties:

automatic control of the variations of illumination power throughout a given period of time, absence of control wire, and possibility of controlling individually every source of light in the installation.

This object is reached with a device of the type defined hereinabove wherein, according to the invention, each control circuit associated to a light source comprises:

a clock circuit delivering clock signals at predetermined time intervals, an illuminating programme circuit in which is recorded a programme representing the required timed variations of the illuminating power for a given period, a selection circuit receiving the clock pulses and connected to the programme circuit for selecting an illuminating power dependent on the elapsed time from the beginning of the said period, and, an output circuit connected to the programme circuit and converting said selected power to a particular magnitude of said electrical quantity.

The illuminating programme is thus read at the rhythm of the clock signals for an operating period corresponding for example to a daily lighting cycle.

According to a special feature of the device according to the invention, the clock signals have a frequency which is obtained by dividing that of the system. It is possible to select for the clock signals a frequency equal for example to about one hour, the programme being set so as to allocate a special illuminating power for each one-hour slot of operation. At the beginning of said period, the clock circuit is reset to zero by means of a reset-to-zero circuit connected to the system in order to be activated when the installation is switched on.

As a variant, the clock circuit can be constituted by an oscillator, a quartz oscillator for example, which operates with an independent source of light or which is supplied by the system when this is switched on.

According to another feature of the invention, the programme circuit is formed by a matrix with a plurality of inputs connected to the selection circuit, a plurality of outputs each one connected to a terminal controlling a respective switching circuit and connections connecting each input to a specific output depending on the required programme of illuminating power variation.

Another feature of the device according to the invention is that the power variation circuit associated to a light source comprises a switching circuit connected between a terminal of the supply system and the source, and a circuit causing the closing of the switching circuit for an adjustable fraction of each alternation of the voltage of the system. The switching circuit can for example be constituted, as known per se, by a thyristor- or triac-type element of which the operation and non-operation durations can be determined by means of a monostable multivibrator delivering pulses of variable duration. An illuminating power variation circuit of this type is described in U.S. patent application Ser. No. 217,868 filed on Dec. 18, 1980 for "Control circuit for a discharge lamp" and assigned to ELAM LIMITED the Assignee of the present application. The duration of the pulses of the monostable is controlled by the output value of the control circuit. Said output value can then be, for example, a continuous voltage applied to the said monostable as loading voltage the variation of which causes a reverse variation of the duration of the pulses delivered by the monostable.

According to yet another feature of the device of the invention, the programme circuit is in the form of a plug-in module. The modification of the illuminating programme of a light source can then be achieved very simply by disconnecting the programme circuit and replacing it with another or with the same one modified.

Still advantageously, the power variation circuit and the control circuit, both of which are associated to a light source are fed electricity from the system and are contained in the housing on which is mounted the light source. The fitting of these circuits is then extremely simplified and can be effected on existing installations without involving modifications of any importance, which is a great advantage.

Figure 2:
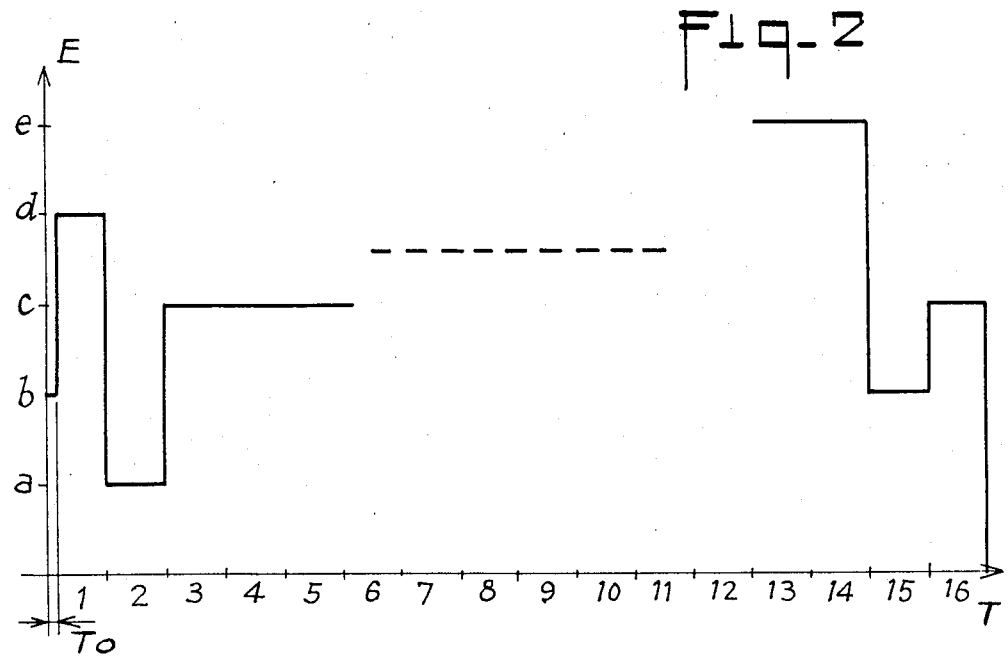
Figure 3:
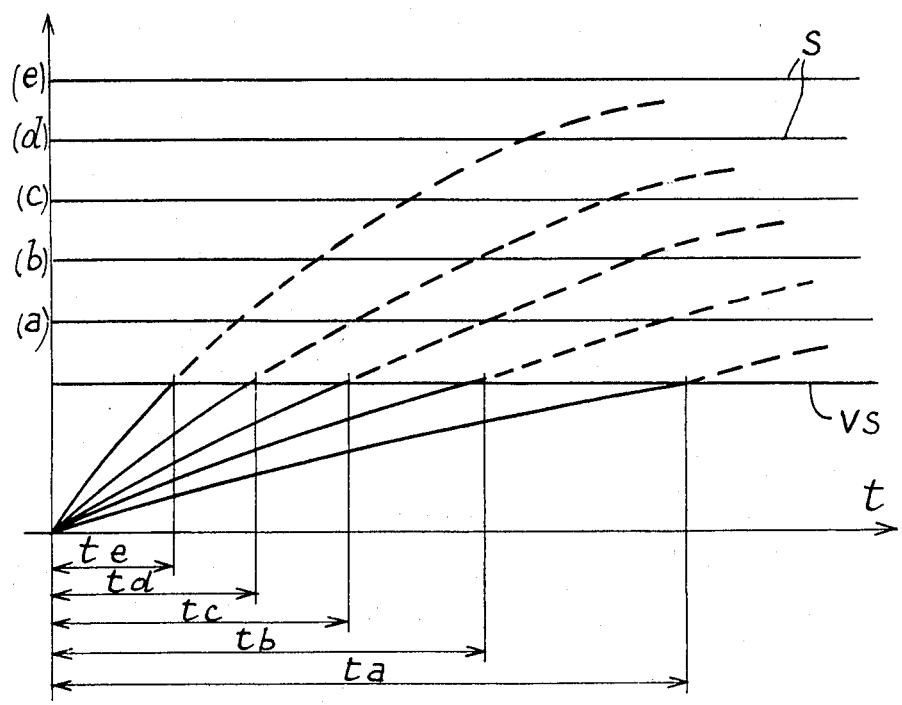

The invention will be more readily understood on reading the following description with reference to the accompanying drawings in which:

FIG. 1 is a diagrammatical view of the circuits associated to a light source in a device according to the invention, FIG. 2 is a representation of a lighting programme, and FIG. 3 is a group of curves showing the relations between the loading voltage applied to the monostable multivibrator illustrated in FIG. 1 and the duration of the pulses delivered by the said monostable.

FIG. 1 shows a discharge lamp 1 connected in series with an induction coil 2, forming ballast, and with a triac 3, forming control switch, between two connecting terminals 4, 5 connecting it to an A.C. supply system.

The states of conduction and of non-conduction of the triac 3 are determined by means of an illuminating power variation circuit to keep the triac 3 conductive during an adjustable fraction of each alternation of the voltage of the system in relation to the amplitude of the output quantity S of a control circuit 20.

The continuous supply voltage, necessary for the elements of circuits 10 and 20 to work is achieved by rectifying and limiting the voltage of the system.

FIG. 1 only shows the circuits associated to a lamp 1. But of course, identical circuits are associated to each lamp of a lighting installation supplied by the system 6.

The circuit 10 is for example of the type of that described in the above mentioned U.S. patent application Ser. No. 245,243, filed on Mar. 19, 1981. It comprises a circuit 11 of which the input terminal is connected to the common connecting point between the lamp 1 and the triac 3 and which detects the passages-through-zero of the voltage at the terminals of the lamp 1. At each detection of passage through zero the circuit 11 delivers a pulse which triggers a monostable multivibrators 12. This delivers a pulse $\theta$ of adjustable duration t to a circuit 13 which is connected to the control electrode 3a of the triac 3 to lock the latter throughout the duration $\theta$. Thus, the monostable 12 determines periods of non-conduction of the triac 3, and the greater the duration $\theta$ of the pulses of the monostable 12, the smaller the illuminating power of the lamp 1. Said duration $\theta$ varies according to the amplitude of the output quantity S in a way which will be described hereinafter in detail.

The control circuit 20 comprises essentially a clock 30, a selection circuit 39 connected to the output terminal of the clock 30, an illuminating programme circuit 40 whose inputs are connected to the selection circuit 35 and an output circuit 30 connected to the outputs of the illumination programme circuit 40 and delivering the output quantity S.

A reference terminal 21, or earth of the circuit 20 is connected to the terminal 5 via a diode 22, whereas a positive voltage terminal 23 is connected to the terminal 4 via a diode 24. The diodes 22 and 24 prevent any return towards the system. A capacitor 25 is connected between the terminals 23 and 21.

The clock circuit 30 comprises a counter 31 whose input 31a is connected to the terminal 4 via a voltage-dividing point constituted by two resistors 32, 33 and by a converter circuit 34. The converter circuit 34 converts the phase voltage of the system taken from the terminal 4 and divided by the bridge 32–33 into pulses of a level compatible with the logic circuit 31. The counter 31 is a binary counter whose outputs are combined so that the clock circuit delivers clock signals of predetermined period. For example, the system frequency being 50 Hz and the period required for the clock signals being one hour, the circuit 30 should constitute a frequency divider by 180,000. An approximation of this figure is given by $2^{14}+2^{15}+2^{17}$. A four-input AND gate 36 has three of its inputs connected directly to the rank binary outputs 14, 15 and 17 of the counter 31 and its fourth input connected to the rank output 16 via reversing switch 37. A clock signal H is delivered at the output of the AND gate when the contents of the counter 31 reaches the value $2^{14}+2^{15}+2^{17}$ (i.e. 180224). The signal H is applied via an OR gate 35 to the input 31a for resetting the counter 31 to zero. Thus, the clock circuit 30 delivers clock signals with a period of about one hour (1 hr. and 4.48 secs to be precise, the precision being largely sufficient for the application considered). It will be noted that a divider by exactly 180,000 can be achieved by adequately combining the binary outputs of the counter 31 and so by complicating somewhat the clock circuit.

The counter 31 is reset to zero when the system is switched on by a signal Z applied to an input of the OR gate 35 and taken from the middle point between a resistor 38 connected by its other terminal to the terminal 23 and a capacitor 39 connected by its other terminal to the earth 21.

In the illustrated example, the illumination programme circuit 40 is formed by a matrix comprising the line $1_1, 1_2, \ldots 1_{15}, 1_{16}$ and columns a, b, c, d, e, .... The lines corresponding to the successive time slots of an illumination period, such as for example a daily illumination period for a public lighting installation. Each line corresponds to a time slot of the illumination period. The number of lines here is selected to be equal to 16; but it can be more or less. Each column corresponds to a level of illuminating power. The number of columns here is equal to five, this permitting to select one amongst five different levels rising for example between a and e. Of course, the number of levels available can be selected to be more or less than 5.

The circuit 40 is completed by connecting elements 41 joining each line to a special column depending on the illuminating power required during the time period corresponding to the line. FIG. 2 illustrates by way of example, part of a gauge representing the illumination levels E required, in relation to the one-hour intervals T, this being reproduced by the circuit 40 of FIG. 1.

The selection circuit 39 is an ordinal counter receiving at its input terminal 39a the clock signals H and having 16 output terminals connected to the lines of the matrix 40. A high logic level signal is produced on the nth output of the counter 39 when the latter receives the nth clock signal H, this meaning that the nth time slot is entered into since the system is powered. It will be noted that the signal Z is applied to the reset to zero input 39z of the counter 39 to reset the latter to zero when the system is powered.

At the beginning of the illuminating period, it is preferable for the lamp 1 to be switched on under reduced power, at power level b for example. A series circuit comprising a resistor 42 and a capacitor 43 forms a circuit with time constant connected between the terminal 23 and the earth 21. The voltage A taken between the earth 21 and the common point between the resistor 42 and the capacitor 43 increases progressively. Said voltage A is applied to an input terminal of a two-input AND gate 44, whose other input is connected to the first output of the selection circuit 39 and whose output is connected to the first line of matrix 40. After a period of time $T_o$ following the powering of the system, the voltage A reaches a value which is sufficient to open the gate 44 to the signal present on the first output of the selection circuit and authorizes the transmission of said signal on the first line of the matrix 40. During said period $T_o$, a signal is produced by a reversing switch 45 receiving the voltage A and whose output is connected to the column b of the matrix 40. The time period $T_o$ is selected to be equal to a small fraction of the first one-hour slot, a few minutes for example.

The signal Z is applied to the input of an operator 47 whose output is connected via a diode 48 to the common point between the resistor 42 and the capacitor 43. Said operator 47 has a nil output voltage as long as the input voltage has not reached the triggering threshold of the operator. Thus when the installation is switched on, the capacitor 43 is completely unloaded and cannot load itself up as long as the operator 47 has not triggered since it is shunted by the diode 48. The timing will therefore become effective only from the moment when the magnitude of the signal Z reaches the triggering threshold of the operator 47. It is then ensured that the period $T_o$ is respected in every case.

The columns of the matrix 40 are connected via adapter-inverted amplifiers 46a to 46e and of resistors 51a to 51e to the transistor bases 52a to 52e of the output circuit 50. Each transistor has its collector connected to a joint output 54 via a respective diode 53a to 53e and its emitter connected, on the one hand, at its base via a respective resistor 55a to 55e and on the other hand, to a respective intermediate output terminal a', b', c', d', e' of a voltage divider 57 made up of resistors 56a to 56e connected in series between the earth 21 and the terminal 23.

The signal present on the selected column of the matrix 40 causes the release of the corresponding transistor amongst the transistors 52a to 52e and the appearance on the joint terminal 54 of the voltage found on the corresponding intermediate terminal of the voltage divider 57.

Thus, each level of illuminating power selected is converted into a special D.C. voltage level on the joint terminal 54.

The voltage on the joint terminal 54 varies step-wise when the columns selected in the circuit 40 change, the said voltage being all the greater that the required illumination level is higher. It is recommended to avoid that these step-wise variations result in sudden variations of the electrical power supplied to the lamp 1, in particular when the power has been reduced in the case of a discharge lamp. Indeed, a sudden drop in power can cause a variation of the arc voltage leading to lamp failure. For this reason, the step-wise variations of the voltage on the terminal 54 are integrated in order to be converted into progressive variations. To this effect, a circuit with time constant which comprises a resistor 58 in series with a capacitor 59 is connected between the terminal 54 and the earth 21. The middle point between the resistor 58 and the capacitor 59 is applied to the non-inverter input of an amplifier 60 whose inverter input is connected to the earth 21 by a resistor 61. The output of the amplifier 60 is connected to the inverter input via a resistor 62 and constitutes the output of the control circuit on which the output quantity S is available in variable voltage form.

The magnitude of the voltage S determines the duration $\theta$ of the pulses delivered by the monostable circuit 12. In the present case, the duration $\theta$ is the time elapsing between the moment when the capacitor 15 of the monostable starts being loaded, i.e. when the monostable is triggered, (rear edge of the pulse 1) and the moment when the voltage at the terminals of the capacitor 15 reaches the threshold value for which the output circuit of the monostable is switched and causes the monostable to return to its stable state (front edge of the pulse). The threshold value is reached all that quicker that the voltage under which the capacitor is loaded is high.

The output quantity S is used as loading voltage for the monostable 12. It is applied to one of the terminals of the capacitor 15 via a resistor 14. The greater the magnitude of the output quantity S the shorter the period needed for the voltage at the terminals of the capacitor 15 to reach the threshold value VS. Thus, as shown in FIG. 3, when the required illumination level increases, the duration $\theta$ of the pulses delivered by the monostable takes decreasing values $t_a$ to $t_e$ and the triac non-conductive period reduces by as much.

As already indicated, the circuits 10 and 20 are supplied when the system is witched on and they require no auxiliary D.C. supply. Furthermore, said circuits are easily housed in the casing of the lamp 1 because of their reduced volume.

The constitution of the programme circuit 40 is extremely simple, this permitting a rapid modification of the illumination programme. Advantageously, the matrix 40 is mounted on a plugging-in support. The programming of the control circuit can then be modified simply by unplugging the matrix in position and plugging in another.

It will be noted that the assembly consisting of the programme circuit 40 and the selection circuit constitutes a memory and its associated addressing circuit. Therefore, it will be possible to replace this assembly by any other device comprising a memory and means providing access thereto, such as for example a read-only memory and an addressing counter in the form of an integrated circuit.

Moreover, and as already indicated, the clock circuit can be constituted by a time base independent of the frequency of the system, such as for example a quartz oscillator with an independent voltage source. In this case, the clock circuit may also be in integrated circuit form.

It is also important to note that a device utilizing the microprogramming techniques can be used within the scope of the invention, at least to obtain the clock and programming functions. Thus, the clock, the programme and the selection circuits, and even also part at least of the output circuit can be realized by means of a microprocessor which has been programmed to this effect.

Also the output quantity of the control circuit can be an electrical quantity other than the voltage, for example a variable resistor or a variable frequency. The power variation circuit is then designed so as to be responsive to the variation of the electrical quantity selected.

Finally, although the description given hereinabove has been concentrated on the case of the control of the power in a lighting installation using discharge lamps, said power control can be used with other types of illuminating sources.

What is claimed is:

1. In a lighting installation comprising a plurality of light sources connected to an A.C. power supply system, control means for controlling the variation with respect to time of the power of illumination of said installation, said control means comprising, associated to each light source:

a clock circuit delivering clock signals at predetermined time intervals;

reset means connected to said power supply system and to said clock circuit for resetting the clock circuit in response to the switching on of the power supply system;

circuit means having stored therein in a non-volatile form a predetermined illuminating programme representing a desired step-wise variation of the illuminating power of said light source over a working period of the lighting installation;

selection means connection to said clock circuit and programme circuit means and including counting means for counting said clock signals;

control signal generating means connected to said programme circuit means for generating a control signal having a magnitude which varies in a step-wise manner and is representative of a value selected in said programme circuit means as a function of the number of clock signals counted by said counting means;

means connected to said control signal generating means for varying progressively the magnitude of the control signal from one step to another;

a switching circuit connected between a terminal of said power supply system and the light source; and a control circuit connected to said switching circuit and responsive to said control signal for controlling the closing of the switching circuit during a fraction of each alternation of the power system voltage, said fraction having a duration which is a function of the magnitude of the control signal.

2. Control means as claimed in claim 1, wherein said clock circuit comprises a frequency divider having an input connected to said power supply system for generating clock signals at a frequency obtained by division of the frequency of the power supply system.

3. Control means as claimed in claim 1, wherein said control circuit comprises a monostable multivibrator circuit delivering pulses of a duration representing said fraction of each alternation of the power supply system.

4. Control means as claimed in claim 3, wherein said control signal is in the form of a D.C. voltage applied to said monostable circuit as loading voltage whose variation causes a reverse variation of the pulse duration.

5. Control means as claimed in claim 3, wherein said programme circuit means is formed by a matrix having a plurality of inputs connected to said selection means and a plurality of outputs connected to said control signal generating means.

6. Control means as claimed in claim 3, wherein said programme circuit means is in the form of a plugging-in module.

7. Control means as claimed in claim 3, and comprising timing means responsive to the switching on of said power supply system for inhibiting said selection means and imposing a predetermined reduced illuminating power for a predetermined time interval.

8. Control means as claimed in claim 3, having its constituents supplied with electrical energy from said power supply system and contained in a housing on which said light source is mounted.

* * * * *